(12) United States Patent
Karim

(10) Patent No.: US 6,973,480 B2
(45) Date of Patent: Dec. 6, 2005

(54) MECHANISM FOR IMPLEMENTING SERVER-SIDE PLUGLETS

(75) Inventor: Ron Karim, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 254 days.

(21) Appl. No.: 10/256,673

(22) Filed: Sep. 26, 2002

(65) Prior Publication Data

US 2004/0221002 A1 Nov. 4, 2004

(51) Int. Cl.$^7$ .............................. G06F 15/16
(52) U.S. Cl. ..................................... 709/203
(58) Field of Search ................. 709/202, 203, 709/208, 247

(56) References Cited

U.S. PATENT DOCUMENTS

| | | | |
|---|---|---|---|
| 6,012,086 A * | 1/2000 | Lowell ........................ | 709/218 |
| 6,026,404 A * | 2/2000 | Adunuthula et al. .......... | 707/10 |
| 6,038,603 A | 3/2000 | Joseph | |
| 6,098,093 A * | 8/2000 | Bayeh et al. ............... | 709/203 |
| 6,154,751 A * | 11/2000 | Ault et al. .................. | 707/201 |
| 6,175,864 B1 * | 1/2001 | Addison et al. ............ | 709/219 |

OTHER PUBLICATIONS

Netscape Communications Corporation, Copyright © 1997 (last updated Jan. 15, 1997), Chapter I, entitled "Plug-in Basics", printed Jan. 6, 2003 (pp. 1-15) http://developer.netscape.com/docs/manuals/communicator/plugin/basic.htm.

Netscape Communications Corporation, Copyright © 1997 (last updated Jan. 15, 1997) Chapter 4, entitled "Drawing and Event Handling", printed Jan. 6, 2003 (pp. 1-13) http://developer.netscape.com/docs/manuals/communicator/plugin/basic.htm.

The Patent Office, Patents Directorate, United Kingdom, "Examination Report," UK patent application No. 0505966.2, International Phase of PCT/US03/30393, dated Jun. 23, 2005, 3 pages.

Current Claims of UK patent application No. 0505966.2, International Phase of PCT/US03/30393, 11 pages.

Kuo, Chia-Chen et al., "Design and Implementation of A Network Application Architecture for Thin Clients," Proceedings of the 26$^{th}$ Annual International Computer Software and Applications Conference (COMPSAC'02), 6 pages.

* cited by examiner

Primary Examiner—David Y. Eng
(74) Attorney, Agent, or Firm—Hickman Palermo Truong & Becker, LLP; Christopher J. Brokaw

(57) ABSTRACT

A server-centric approach is disclosed for enabling a browser to handle content types that it cannot inherently process. Rather than executing plug-ins on a client, pluglets are executed on one or more servers. A pluglet can perform any function that a plug-in can perform. Because a pluglet resides and executes on a server, the shortcomings of the plug-in approach are overcome. Specifically, a client no longer needs to have large amounts of storage and processing resources since pluglets do not run on clients. Also, a user no longer needs to install plug-ins on a client. In addition, maintenance of the overall system is greatly simplified. To replace, add, or remove functionality, all that needs to be done is to replace, add, or remove pluglets from a relatively small number of servers. It is no longer necessary to maintain plug-ins on a relatively large number of clients. Thus, the server-centric approach enables the benefits of plug-in technology to be realized, but does so without suffering the associated shortcomings.

42 Claims, 5 Drawing Sheets

MECHANISM FOR IMPLEMENTING SERVER-SIDE PLUGLETS

FIELD OF THE INVENTION

This invention relates generally to computing technology, and more particularly to a mechanism for implementing server-side pluglets.

BACKGROUND

In the process of accessing web pages from various servers on the Internet, a browser program encounters many different types of content. The browser has inherent functionality to render some types of content (e.g. simple HTML), but for other types of content (such as data in Adobe Acrobat format, audio/visual data, Java applets, etc.), the browser needs some aid from other programs. To enable a browser to handle content types that the browser does not have inherent functionality to process, "plug-ins" are typically used. A plug-in is a set of code that plugs in to an interface of the browser. While a plug-in is a set of code separate from the browser, it can be invoked by the browser, via the interface, to process certain types of content. Thus, with plug-ins, it is possible to extend the types of content that a browser can handle.

FIG. 1 shows a typical configuration in which plug-ins are used. As shown, the browser 108 and the plug-ins 110 reside and execute on the client 102. The browser 108 invokes and communicates with the plug-ins 110 via the plug-in API (application programming interface) 112. When a plug-in 110 is added to the client 102, it is registered with the browser 108. In the registration process, the content type or types that the plug-in can process is specified. Thus, after registration, the browser 108 knows which plug-in 110 to invoke for which content types.

In operation, when the browser 108 receives a web page from a server 106 across a network 104, it determines whether the web page contains any content which is of a type that the browser cannot inherently process. If so, the browser 108 determines the content type, determines the plug-in 110 registered to handle that content type, invokes the appropriate plug-in 110, and forwards the content to the plug-in 110 for processing. In this manner, the browser 108 is able to handle content types that it does not have inherent functionality to process.

While effective in some implementations, the above plug-in approach has some significant drawbacks. A first drawback is that the plug-ins 110 need to reside and execute on the client 102. Because of the many different types of content that can be found on web pages, there may need to be many different plug-ins 110 on the client 102. Also, some of these plug-ins 110 may be rather sophisticated, which means that they can be quite large. As a result, in order to implement the above approach, a client 102 needs to have a large amount of storage and a large amount of processing resources. For powerful clients, this is not a problem, but for less powerful clients, such as PDA's (personal digital assistants) and network computers, which have limited storage and processing resources, the above approach cannot be effectively implemented.

Another drawback of the above approach is that it is difficult for less sophisticated users to implement. Because a plug-in 110 resides on the client 102, it must be installed on the client 102 before it can be invoked. This usually involves downloading the plug-in 110 from some source, and then running an installation program to install the plug-in on the client 102. Users with little computer expertise may find this process difficult and, at the very least, inconvenient.

Yet another drawback of the above approach is that it is difficult to maintain for large-scale systems (i.e. systems with a large number of clients 102). Because plug-ins 110 reside on clients 102, if a plug-in 110 needs to be replaced, added, or removed from an overall system, an administrator will have to replace, add, or remove the plug-in 110 from every single client 102 in the system. For large-scale systems, this can be a daunting and very time-consuming task.

The plug-in approach also has a performance drawback. Specifically, each time a user enters a page that invokes a plug-in, the plug-in is started and initialized. When the user exits that page, the plug-in is terminated. This overhead of starting, initializing, and stopping the plug-in every time the plug-in is invoked degrades the performance of the client.

In view of the shortcomings discussed above, it is clear that the plug-in approach to extending a browser's ability to handle different types of content is less than optimal. As a result, an improved approach is needed.

SUMMARY

To overcome the shortcomings of the plug-in approach, there is provided a server-centric approach. In one embodiment, rather than executing plug-ins on a client, pluglets are executed on one or more servers. A pluglet can perform any function that a plug-in can perform. Because a pluglet resides and executes on a server, the shortcomings of the plug-in approach are overcome. Specifically, a client no longer needs to have large amounts of storage and processing resources since pluglets do not run on clients. Also, a user no longer needs to install plug-ins on a client. In addition, maintenance of the overall system is greatly simplified. To replace, add, or remove functionality, all that needs to be done is to replace, add, or remove pluglets from a relatively small number of servers. It is no longer necessary to maintain plug-ins on a relatively large number of clients. Thus, the server-centric approach enables the benefits of plug-in technology to be realized, but does so without suffering the associated shortcomings.

DETAILED DESCRIPTION OF EMBODIMENT(S)

System Overview

Figure 1:
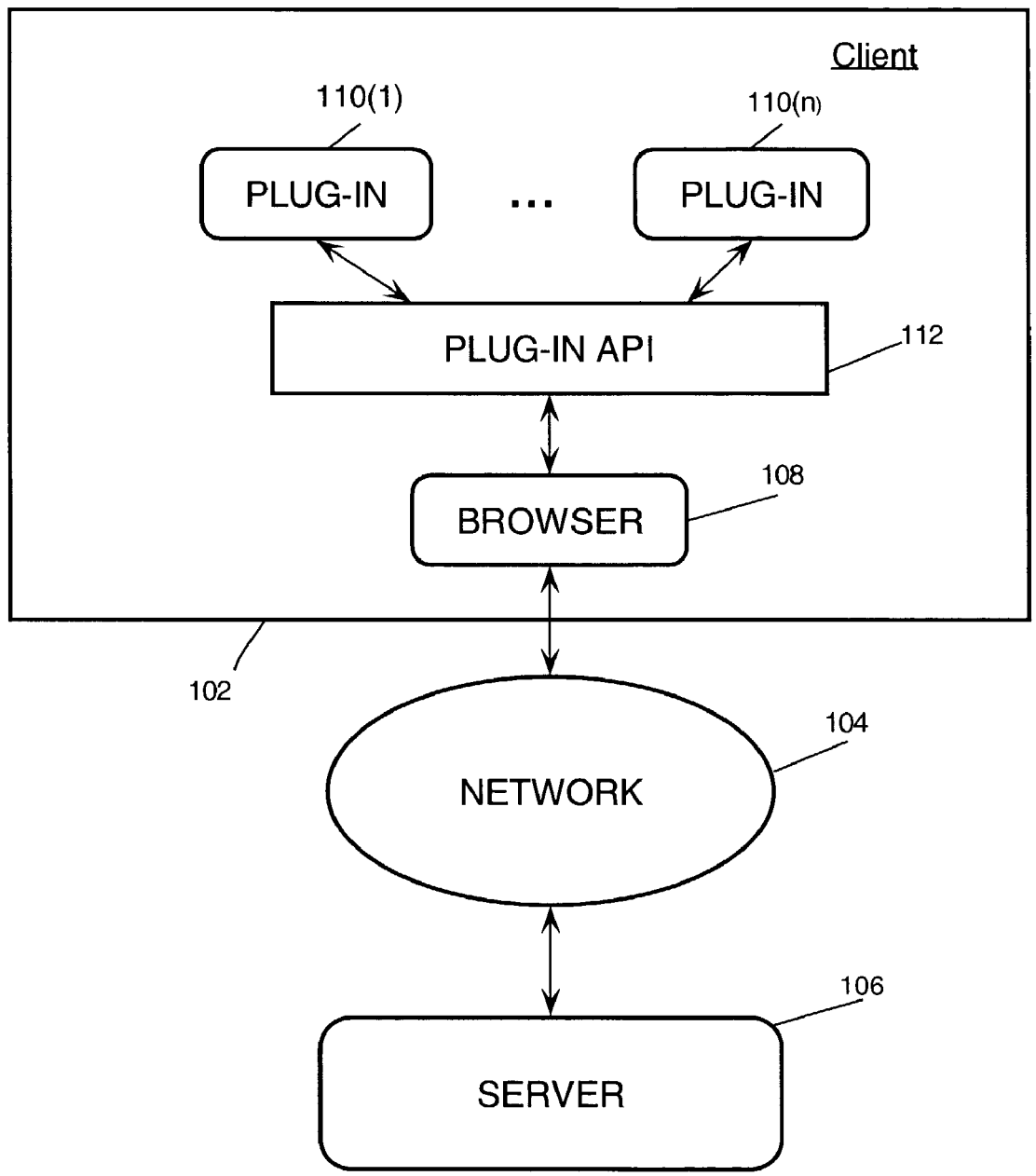
FIG. 1 is a functional block diagram of a typical system in which plug-ins are used.
Figure 2:
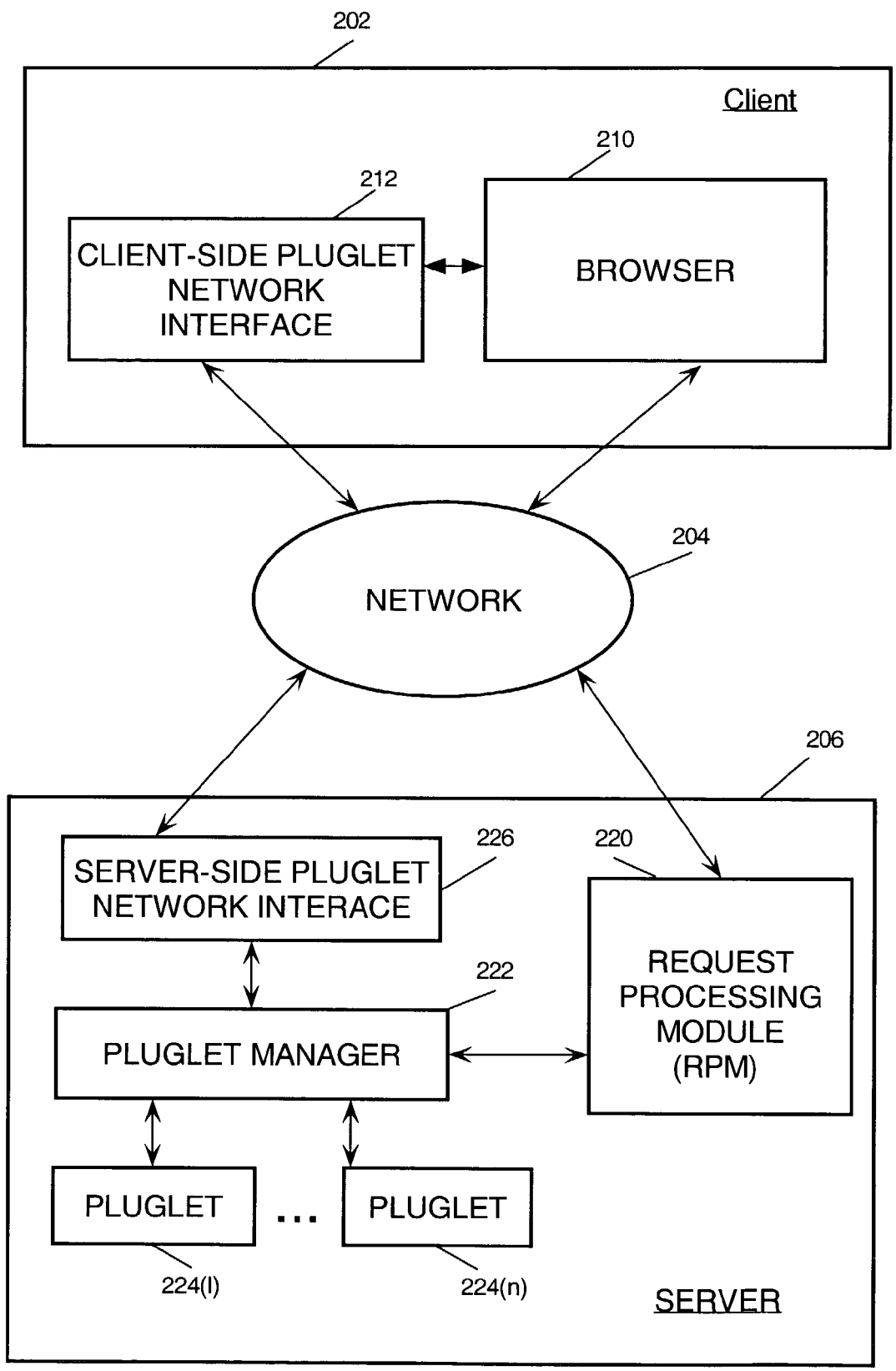
FIG. 2 is a functional block diagram of a system in which one embodiment of the present invention may be implemented.

With reference to FIG. 2, there is shown a functional block diagram of a system 200 in which one embodiment of the present invention may be implemented. As shown, system 200 comprises a client 202, a server 206, and a network 204 for facilitating communication between the client 202 and the server 206. For purposes of the present invention, network 204 may be a LAN (local area network), a WAN (wide area network) such as the Internet, or any other mechanism that enables the client 202 to communicate with the server 206. For the sake of simplicity, only one client 202 and one server 206 are shown in system 200. It should be noted, however, that system 200 may comprise any number of clients 202 and servers 206.

Client

In one embodiment, the client 202 comprises a browser 210 and a client-side pluglet network interface 212. The browser 210 enables a user to access and to render content residing on one or more remote servers 206. Browser 210 may take the form of any known browser, such as Netscape Communicator, Internet Explorer, or any other browser. Basically, any mechanism capable of enabling a user to access and to render content residing on remote servers may serve as the browser 210.

In the course of accessing and rendering content, client 202 may interact with one or more pluglets 224. To facilitate this interaction, there is provided the client-side pluglet network interface 212. In one embodiment, network interface 212 performs a number of functions, including but not limited to: (1) maintaining a connection between client 202 and a server 206; (2) receiving events from the browser 210; (3) forwarding selected events to one or more appropriate pluglets 224; (4) receiving updated processed data from the one or more pluglets 224; and (5) forwarding the updated processed data to the browser 210 for rendering. Basically, network interface 212 acts as an intermediary between the pluglets 224 and the browser 210 to make interaction with the pluglets 224 transparent to the browser 210. The operation and interaction of the browser 210 and network interface 212 will be elaborated upon in a later section.

In one embodiment, the functionality of the browser 210 and the network interface 212 are implemented by having one or more processors (not shown) execute one or more sets of computer code. As an alternative, the functionality of these components 210, 212 may be implemented using hardwired logic. For purposes of the present invention, these and other implementations may be used.

Server

In one embodiment, server 206 comprises a request processing module (RPM) 220, a pluglet manager 222, one or more pluglets 224, and a server-side pluglet network interface 226. The RPM 220 is the component that receives content requests from the browser 210. In response to a content request, the RPM 220 obtains a set of content specified by the request. In obtaining the content, the RPM 220 may simply retrieve the content from a data store (not shown) if the content is static, or the RPM 220 may dynamically generate the content. The RPM 220 may dynamically generate content by executing a Java servlet, a CGI (common gateway interface) program, a JSP (Java server page), or any other mechanism that gives rise to dynamically generated content.

After obtaining the requested content, the RPM 220 returns the content to the browser 210. In one embodiment, before sending the requested content to the browser 210, the RPM 220 first determines whether any subset of the requested content is of a type that cannot be inherently rendered by the browser 210. For example, a subset of the content may be in pdf format, which requires Adobe Acrobat to render. If so, then the RPM 220 enlists the aid of the pluglet manager 222. Specifically, the RPM 220 passes the subset of the content to the pluglet manager 222 for processing by one of the pluglets 224. In return, the RPM 220 receives from the pluglet manager 222 a set of processed data, which represents the subset of the content, but which is in a format that the browser 210 can inherently process. For example, the processed data may be a transformation of the content in pdf format into an image (e.g. a set of pixels) that the browser 210 can render. This processed data, along with the rest of the requested content, is sent to the browser 210 in response to the content request. Because the processed data is in a format that the browser 210 can inherently process, the browser 210 will be able to render all of the requested content. Hence, through the use of pluglets 224, the browser 210 is able to handle content types that it does not have inherent capability to process.

To enable the pluglets 224 to be properly managed, there is provided the pluglet manager 222. The pluglet manager 222 manages all aspects of the operation of the pluglets 224, including interaction with the RPM 220, interaction with the server-side pluglet network interface 226, and registration of the pluglets 224. Interaction between the pluglet manager 222 and the RPM 220 and network interface 226 will be elaborated upon in a later section. With regard to registration, whenever a pluglet 224 is added to the server 206, it is registered with the pluglet manager 222. In the registration process, the content type or types that the pluglet 224 can process is specified. Thus, after registration, the pluglet manager 222 knows which pluglet 224 to invoke for which content types. For purposes of the present invention, any number of pluglets 224 may be registered with the pluglet manager 222, and each pluglet 224 may implement any desired functionality. So long as a pluglet 224 can register and interact with the pluglet manager 222, it can be implemented in the server 206. In one embodiment, the pluglet manager 222 starts and initializes each pluglet 224 upon server start-up. Once started, each pluglet 224 keeps running throughout the course of normal operation. That way, when a pluglet 224 is invoked during normal operation, no delay or overhead is incurred for starting and stopping the pluglet 224.

The server-side pluglet network interface 226 enables the server 206 to interact with the client-side pluglet network interface 212 of the client 202. In one embodiment, the server-side pluglet network interface 226 performs various functions, including: (1) maintaining a connection with the client 202; (2) receiving events from the client-side pluglet network interface 212; (3) forwarding those events to the pluglet manager 222 for processing by one or more of the pluglets 224; (4) receiving updated processed data from the pluglet manager 222; and (5) forwarding the updated processed data to the client-side pluglet network interface 212. Basically, the server-side pluglet network interface 226 acts as an intermediary to facilitate pluglet-related information exchange between the client 202 and the server 206.

In one embodiment, the functionality of the RPM 220, pluglet manager 222, pluglets 224, and network interface 226 are implemented by having one or more processors (not shown) execute one or more sets of computer code. As an alternative, the functionality of these components 220, 222, 224, 226 may be implemented using hardwired logic. For purposes of the present invention, these and other implementations may be used.

Operation

Figure 3:
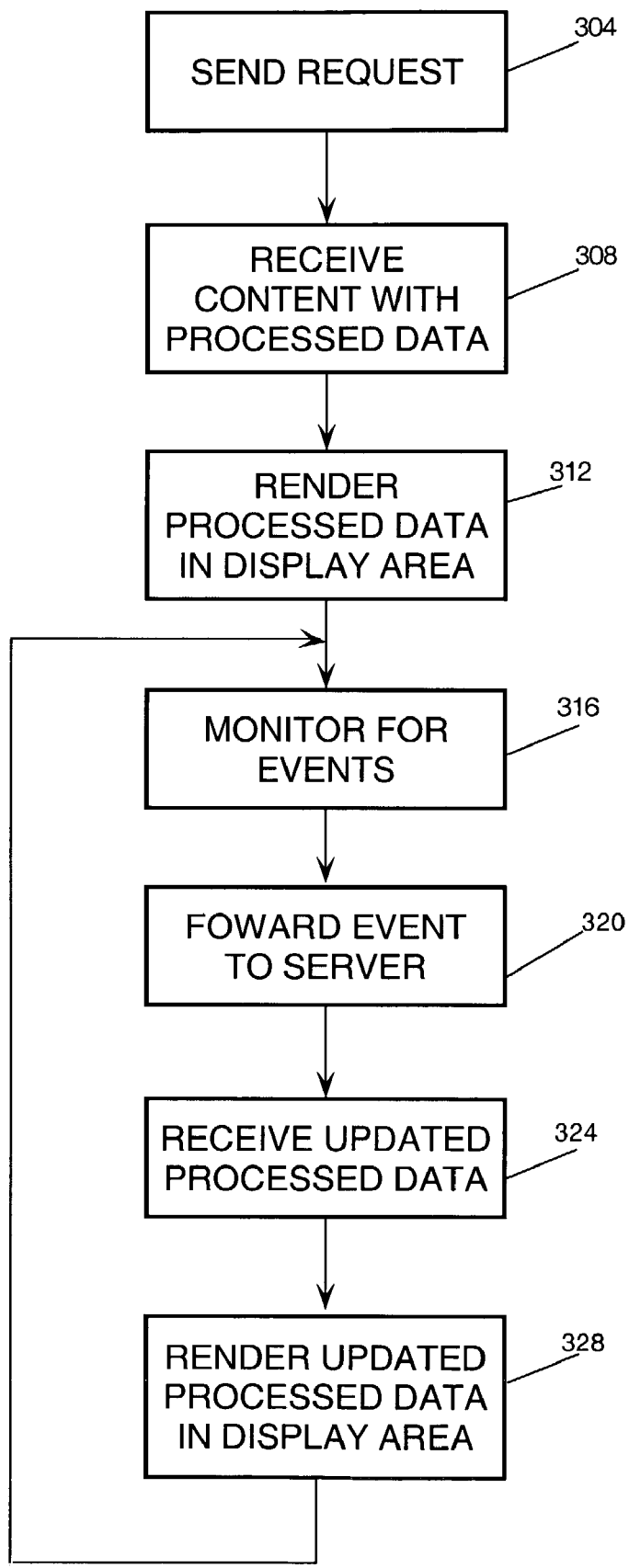
FIG. 3 is a flow diagram illustrating the operation of the client of FIG. 2 in accordance with one embodiment of the present invention.
Figure 4:
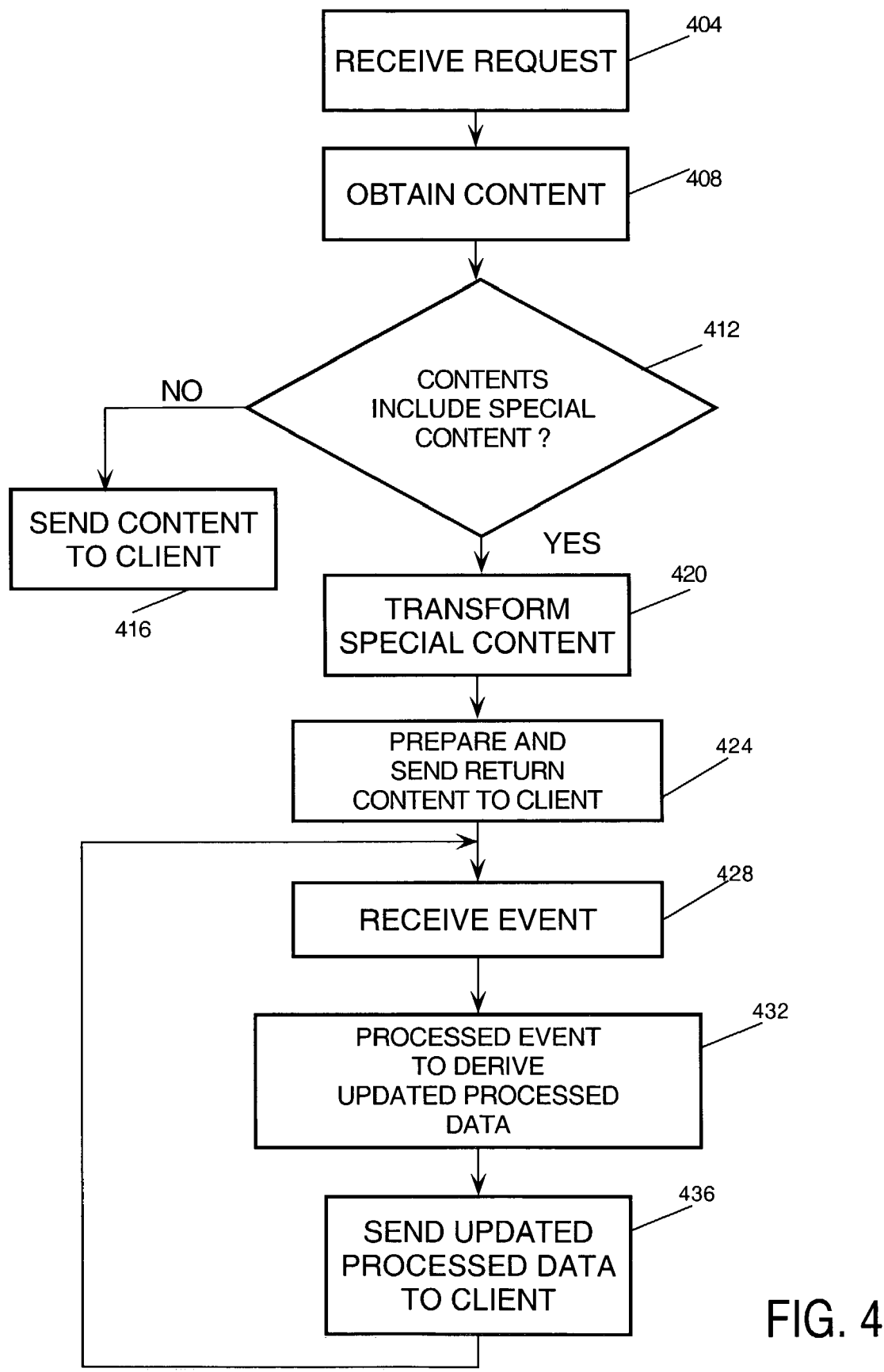
FIG. 4 is a flow diagram illustrating the operation of the server of FIG. 2 in accordance with one embodiment of the present invention.

The various components of sample system 200 have been disclosed. With reference to FIGS. 2–4, the operation of the system 200 in accordance with one embodiment of the present invention will now be described. FIG. 3 is an operational flow diagram illustrating the operation of the client 202. FIG. 4 is an operational flow diagram illustrating the operation of the server 206.

To initiate operation, a user causes the browser 210 to send (304) (FIG. 3) a request for content to the server 206. The user may cause the browser 210 to send this request in various ways, including but not limited to selecting a link on a web page currently being rendered by the browser 210, or by typing in a URL (universal resource locator). In one embodiment, the browser 210 includes in this request a set of information pertaining to the client 202. This set of information may include, for example, an indication of the type of client (e.g. PDA, personal computer, network computer, etc.), what processor is running on the client 202, how much memory and storage the client 202 has, and any other information that indicates what resources are available on the client 202. As will be elaborated upon in a later section, this information enables a pluglet 224 to customize processed data for the client 202.

The request for content is received (404) (FIG. 4) by the RPM 220 of the server 206. In response, the RPM 220 obtains (408) the content specified in the request. If the requested content is static content, the RPM 220 retrieves the content from a data content store (not shown). Otherwise, the RPM 220 may dynamically generate the requested content by executing a Java servlet, a CGI (common gateway interface) program, a JSP (Java server page), or any other mechanism that gives rise to dynamically generated content.

After the requested content is obtained, the RPM 220 determines (412) whether the content comprises any subsets of content that is of a special type that the browser 210 cannot inherently process. In one embodiment, a subset of content has a MIME type (multipurpose Internet mail extension type) associated therewith. If the MIME type associated with a subset of content is of a type that the browser 210 cannot inherently process, then the RPM 220 knows that the subset of content comprises special content. If the requested content does not comprise any subsets of special content, then the RPM 220 sends (416) the requested content back to the browser 210. However, if the requested content comprises any subset of special content, then the subset of special content is transformed (420) before the requested content is sent to the browser 210. For the sake of example, it will be assumed that the requested content comprises one subset of special content (although it should be noted that the requested content may comprise any number of subsets of special content).

To transform the subset of special content, the RPM 220 invokes the pluglet manager 220. In this invocation, the RPM 220 passes to the pluglet manager 220: (1) the information pertaining to the client 202 that was provided as part of the content request from the browser 210; (2) the subset of special content; and (3) the type (e.g. the MIME type) of the special content. Based upon the content type, the pluglet manager 222 selects one of the pluglets 224 to process the special content (for the sake of example, it will be assumed that pluglet 224(n) is selected). The pluglet manager 222 then invokes the selected pluglet 224(n), and passes to it: (1) the information pertaining to the client 202 that was provided as part of the content request from the browser 210; and (2) the subset of special content.

In response to this invocation, the pluglet 224(n) creates a new session ID, since this is the first time the pluglet 224(n) is processing this subset of special content for this client 202. The session ID enables the pluglet 224(n) to uniquely identify this subset of special content for this client 202 so that it can maintain state. The pluglet 224(n) then proceeds to process the subset of special content to transform it into a set of processed data. In one embodiment, the processed data represents the transformation of the special content from a format that the browser 210 cannot inherently process into a format that it can inherently process. For example, the special content may be in pdf format, which the browser 210 cannot process, and the processed data may be an image (e.g. pixels) that the browser 210 can inherently render. In one embodiment, the processed data may further comprise one or more controls (e.g. one or more scroll buttons, an "OK" button, a "Cancel" button, etc.). When activated, these controls may cause the processed data to have to be updated.

In deriving the processed data, the pluglet 224(n) may take into account the information pertaining to the client 202. For example, if the information indicates that the client 202 is a personal computer with large amounts of storage and processing resources, then the pluglet 224(n) may generate a set of processed data that is more elaborate (e.g. an image with high resolution). On the other hand, if the information indicates that the client 202 is a PDA, then the pluglet 224(n) may generate a bare-bones set of processed data. Because the pluglet 224(n) has information on the resources available to the client 202, the pluglet 224(n) can customize the processed data for the client 202.

After deriving the processed data, the pluglet 224(n) provides to the pluglet manager 222: (1) the session ID; and (2) the set of processed data. In turn, the pluglet manager 222 passes this information on to the RPM 220. In addition, the pluglet manager 222 provides to the RPM 220 a reference to the pluglet 224(n). Upon receiving this information, the RPM 220 prepares (424) a set of return content to return to the browser 210. In one embodiment, this return content includes: (1) the part of the original requested content that did not contain special content; (2) the set of processed data from the pluglet 224(n); (3) the reference to the pluglet 224(n); (4) the session ID; and (5) an indication that the set of processed data is associated with a pluglet. In one embodiment, the subset of special content is replaced by the set of processed data and, hence, is not included in the return content. After the set of return content is prepared, the RPM 220 sends (424) the return content to the browser 210.

The return content is received (308) (FIG. 3) by the browser 210. In response, the browser 210 renders the return content. Because everything in the return content, including the set of processed data, is in a format that can be inherently processed by the browser 210, the browser 210 is able to render the entire set of return content. To render (312) the set of processed data, the browser 210 sets aside a specific display area, and renders the processed data within that display area. In addition, from the indication inserted into the return content by the RPM 220, the browser 210 ascertains that the set of processed data is associated with a pluglet. That being the case, the browser 210 knows to interact with the client-side pluglet network interface 212. Specifically, the browser 210 sends to the network interface 212: (1) the reference to the pluglet 224(n); (2) the session ID; and (3) information pertaining to the display area in which the processed data is rendered. In one embodiment, this information may include the coordinates of the upper left hand corner of the display area, and the dimensions of the display area. Thereafter, the browser 210 proceeds to monitor (316) for events.

In one embodiment, the browser 210 monitors for and forwards all events to the network interface 212. Events may include user interface events (such as mouse clicks, keyboard actions, etc.) and other events (such as events from the operating system). Upon receiving these events, the network interface 212 determines whether the events affect the processed data that is being displayed in the display area. In one embodiment, the network interface 212 makes this determination by determining whether an event took place within the display area (e.g. whether a mouse click occurred within the display area). If not, the network interface 212 ignores the event. If so, the network interface 212 forwards (320) the event to the pluglet 224(n) that originally generated the processed data for processing.

To forward the event to the pluglet 224(n), the client-side pluglet network interface 212, in one embodiment, communicates with the server-side pluglet network interface 226. The first time these components 212, 226 communicate, they interact to form a connection that can be used to carry out future communications. After the connection is formed, the client-side pluglet network interface 212 sends the following information to the server-side pluglet network interface 226: (1) the reference to the pluglet 224(n); (2) the session ID; and (3) the event. The server-side pluglet network interface 226 receives (428) (FIG. 4) this information, and forwards it to the pluglet manager 222, which, in turn, forwards the session ID and the event to the pluglet 224(n) for processing.

Using the session ID, the pluglet 224(n) accesses the state information pertaining to the processed data that it previously generated. After accessing the state information, the pluglet 224(n) processes (432) the event (which, for example, may be a mouse click), to determine whether the event causes the processed data to have to be updated. For example, the pluglet 224(n) may determine whether the mouse click occurred on a control (e.g. a scroll button). If the event does cause the processed data to have to be updated, then the pluglet 224(n) generates a set of updated processed data based upon the event. The set of updated processed data may, for example, show the next section of a pdf document after the document has been scrolled. Like the first set of processed data, the set of updated processed data may also comprise one or more controls. The pluglet 224(n) provides the set of updated processed data to the pluglet manager 222. In turn, the pluglet manager 222 forwards the updated processed data to the server-side pluglet network interface 226, which sends (436) the updated processed data to the client-side pluglet network interface 212.

The client-side pluglet network interface 212 receives (324) (FIG. 3) the set of updated processed data, and provides it to the browser 210. In response, the browser 210 renders (328) the updated processed data in the display area to replace the processed data that was previously rendered in the display area. Thereafter, the browser 210 loops back to (316) to monitor for more events. This process of sending events to the pluglet 224(n) on the server 206 and receiving updated processed data from the pluglet 224(n) on the server 206 continues until the user closes the display area. In the manner described, a tight and active coupling is maintained between the client 202 and the pluglet 224(n) on the server 206 to enable the pluglet 224(n) to behave like a plug-in running on the client 202. Thus, plug-in functionality is achieved without storing and executing plug-ins on the client 202.

Hardware Overview

Figure 5:
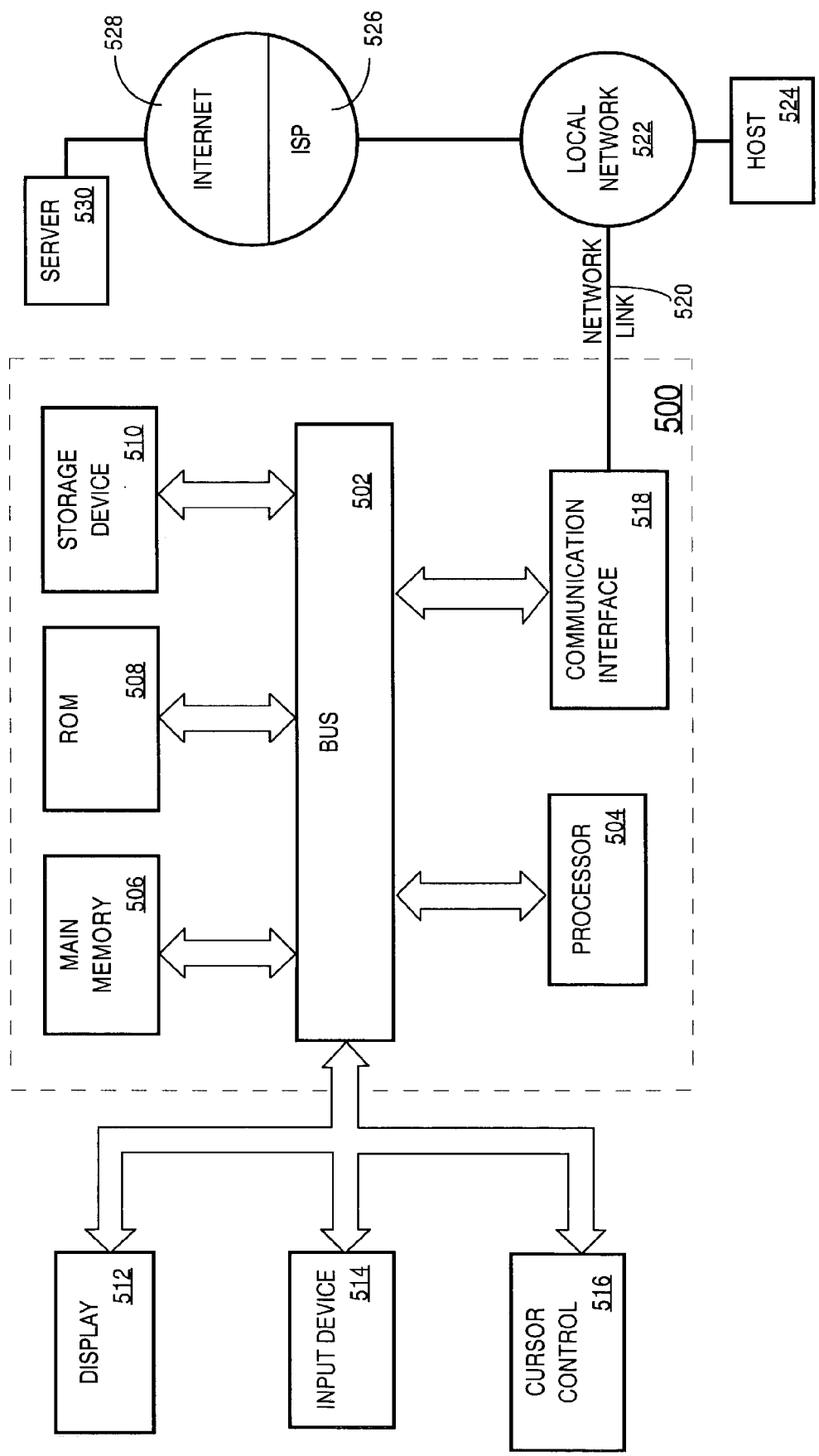
FIG. 5 is a hardware block diagram of a computer system in which one embodiment of the client and/or server of FIG. 2 may be implemented.

As noted previously, in one embodiment, the various components (e.g. 210, 212, 220, 222, 224, and 226) shown in FIG. 2 are implemented as sets of instructions executable by one or more processors. The components may be implemented as part of an object oriented programming system, including but not limited to the JAVA™ programming system manufactured by Sun Microsystems, Inc. of Palo Alto, Calif. FIG. 5 shows a hardware block diagram of a computer system 500 in which one embodiment of the client 202 and/or the server 206 may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 may also be further used to store temporary variables or other intermediate information during execution of instructions by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

According to one embodiment, the functionality of the present invention is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method implemented by a server, comprising:
   receiving a request from a client across a network;
   obtaining a set of content in response to said request;
   determining whether said set of content comprises a subset of special content which is in a form that the client cannot render;
   in response to a determination that said set of content does comprise a subset of special content which is in a form that the client cannot render, transforming said subset of special content into a set of processed data, wherein said set of processed data is representative of said subset of special content, but is in a form that the client can render;
   preparing a set of return content which comprises said set of processed data; and
   sending said set of return content to the client across the network.

2. The method of claim 1, further comprising:
   receiving, across the network, an event from the client;
   determining whether said event causes said set of processed data to have to be updated;
   in response to a determination that said event causes said set of processed data to have to be updated, generating a set of updated processed data based upon said event; and
   sending said set of updated processed data across the network to the client for rendering.

3. The method of claim 2, wherein said set of processed data comprises one or more controls, and wherein determining whether said event causes said set of processed data to have to be updated comprises:
   determining whether said event indicates activation of one or more of said controls.

4. The method of claim 2, wherein determining whether said set of content comprises a subset of special content which is in a form that the client cannot render comprises:
   determining a content type for a subset of content; and
   determining whether said content type is a type that can be rendered by the client.

5. The method of claim 4, wherein said content type is a MIME (multipurpose Internet mail extension) type.

6. The method of claim 2, wherein obtaining comprises:
   retrieving said set of content from a data store.

7. The method of claim 2, wherein obtaining comprises:
   dynamically generating said set of content.

8. The method of claim 2, wherein preparing comprises:
   replacing said subset of special content with said set of processed data such that said set of return data does not comprise said subset of special content.

9. The method of claim 2, wherein said subset of special content is of a particular content type, and wherein transforming comprises:
   selecting a module capable of processing said particular content type; and
   invoking said module to process said subset of special content to derive said set of processed data.

10. The method of claim 9, wherein determining whether said event causes said set of processed data to have to be updated comprises:
    invoking said module to process said event to determine whether said event causes said set of processed data to have to be updated.

11. The method of claim 10, wherein said set of updated processed data is generated by said module.

12. The method of claim 2, wherein said request comprises information indicating resources available on the client, and wherein transforming comprises:
- processing said information; and
- generating said set of processed data in accordance with said information to customize said set of processed data based upon resources available on the client.

13. A method implemented by a client, comprising:
- receiving a set of return content comprising a set of processed data;
- rendering said set of processed data in a display area;
- detecting an event;
- determining whether said event may cause said set of processed data to have to be updated;
- in response to a determination that said event may cause said set of processed data to have to be updated, forwarding said event to a server across a network;
- receiving a set of updated processed data from the server across the network; and
- rendering said set of updated processed data in said display area in place of said set of processed data.

14. The method of claim 13, wherein said event comprises a user interface event, and wherein determining comprises:
- determining whether said user interface event occurred within said display area.

15. A method implemented by a client and a server, comprising:
- the server:
  - receiving a request from the client across a network;
  - obtaining a set of content in response to said request;
  - determining whether said set of content comprises a subset of special content which is in a form that the client cannot render;
  - in response to a determination that said set of content does comprise a subset of special content which is in a form that the client cannot render, transforming said subset of special content into a set of processed data, wherein said set of processed data is representative of said subset of special content, but is in a form that the client can render;
  - preparing a set of return content which comprises said set of processed data;
  - sending said set of return content to the client across the network;
- the client:
  - rendering said set of processed data in a display area;
  - detecting an event;
  - determining whether said event may cause said set of processed data to have to be updated; and
  - in response to a determination that said event may cause said set of processed data to have to be updated, forwarding said event across the network to the server.

16. The method of claim 15, further comprising:
- the server:
  - determining whether said event causes said set of processed data to have to be updated;
  - in response to a determination that said event causes said set of processed data to have to be updated, generating a set of updated processed data based upon said event;
  - sending said set of updated processed data across the network to the client for rendering; and
- the client:
  - rendering said set of updated processed data in said display area in place of said set of processed data.

17. The method of claim 16, wherein said set of processed data comprises one or more controls, and wherein determining, by the server, whether said event causes said set of processed data to have to be updated comprises:
- determining whether said event indicates activation of one or more of said controls.

18. The method of claim 16, wherein said subset of special content is of a particular content type, and wherein transforming comprises:
- selecting a module capable of processing said particular content type; and
- invoking said module to process said subset of special content to derive said set of processed data.

19. The method of claim 18, wherein determining, by the server, whether said event causes said set of processed data to have to be updated comprises:
- invoking said module to process said event to determine whether said event causes said set of processed data to have to be updated.

20. The method of claim 19, wherein said set of updated processed data is generated by said module.

21. The method of claim 16, wherein said event comprises a user interface event, and wherein determining, by the client, whether said event may cause said set of processed data to have to be updated comprises:
- determining whether said user interface event occurred within said display area.

22. A computer readable storage medium, for tangibly storing:
- instructions for causing one or more processors to receive a request from a client across a network;
- instructions for causing one or more processors to obtain a set of content in response to said request;
- instructions for causing one or more processors to determine whether said set of content comprises a subset of special content which is in a form that the client cannot render;
- instructions for causing one or more processors to transform, in response to a determination that said set of content does comprise a subset of special content which is in a form that the client cannot render, said subset of special content into a set of processed data, wherein said set of processed data is representative of said subset of special content, but is in a form that the client can render;
- instructions for causing one or more processors to prepare a set of return content which comprises said set of processed data; and
- instructions for causing one or more processors to send said set of return content to the client across the network.

23. The computer readable medium of claim 22, further comprising:
- instructions for causing one or more processors to receive, across the network, an event from the client;
- instructions for causing one or more processors to determine whether said event causes said set of processed data to have to be updated;
- instructions for causing one or more processors to generate, in response to a determination that said event causes said set of processed data to have to be updated, a set of updated processed data based upon said event; and
- instructions for causing one or more processors to send said set of updated processed data across the network to the client for rendering.

24. The computer readable medium of claim 23, wherein said set of processed data comprises one or more controls, and wherein the instructions for causing one or more processors to determine whether said event causes said set of processed data to have to be updated comprises:
   instructions for causing one or more processors to determine whether said event indicates activation of one or more of said controls.

25. The computer readable medium of claim 23, wherein the instructions for causing one or more processors to determine whether said set of content comprises a subset of special content which is in a form that the client cannot render comprises:
   instructions for causing one or more processors to determine a content type for a subset of content; and
   instructions for causing one or more processors to determine whether said content type is a type that can be rendered by the client.

26. The computer readable medium of claim 25, wherein said content type is a MIME (multipurpose Internet mail extension) type.

27. The computer readable medium of claim 23, wherein the instructions for causing one or more processors to obtain comprises:
   instructions for causing one or more processors to retrieve said set of content from a data store.

28. The computer readable medium of claim 23, wherein the instructions for causing one or more processors to obtain comprises:
   instructions for causing one or more processors to dynamically generate said set of content.

29. The computer readable medium of claim 23, wherein the instructions for causing one or more processors to prepare comprises:
   instructions for causing one or more processors to replace said subset of special content with said set of processed data such that said set of return data does not comprise said subset of special content.

30. The computer readable medium of claim 23, wherein said subset of special content is of a particular content type, and wherein the instructions for causing one or more processors to transform comprises:
   instructions for causing one or more processors to select a module capable of processing said particular content type; and
   instructions for causing one or more processors to invoke said module to process said subset of special content to derive said set of processed data.

31. The computer readable medium of claim 30, wherein the instructions for causing one or more processors to determine whether said event causes said set of processed data to have to be updated comprises:
   instructions for causing one or more processors to invoke said module to process said event to determine whether said event causes said set of processed data to have to be updated.

32. The computer readable medium of claim 31, wherein said set of updated processed data is generated by said module.

33. The computer readable medium of claim 23, wherein said request comprises information indicating resources available on the client, and wherein the instructions for causing one or more processors to transform comprises:
   instructions for causing one or more processors to process said information; and
   instructions for causing one or more processors to generate said set of processed data in accordance with said information to customize said set of processed data based upon resources available on the client.

34. A computer readable medium, comprising:
   instructions for causing one or more processors to receive a set of return content comprising a set of processed data;
   instructions for causing one or more processors to render said set of processed data in a display area;
   instructions for causing one or more processors to detect an event;
   instructions for causing one or more processors to determine whether said event may cause said set of processed data to have to be updated;
   instructions for causing one or more processors to forward, in response to a determination that said event may cause said set of processed data to have to be updated, said event to a server across a network;
   instructions for causing one or more processors to receive a set of updated processed data from the server across the network; and
   instructions for causing one or more processors to render said set of updated processed data in said display area in place of said set of processed data.

35. The computer readable medium of claim 34, wherein said event comprises a user interface event, and wherein the instructions for causing one or more processors to determine comprises:
   instructions for causing one or more processors to determine whether said user interface event occurred within said display area.

36. A system, comprising:
   a client; and
   a server; wherein
   the server performs the operations of:
      receiving a request from the client across a network;
      obtaining a set of content in response to said request;
      determining whether said set of content comprises a subset of special content which is in a form that the client cannot render;
      in response to a determination that said set of content does comprise a subset of special content which is in a form that the client cannot render, transforming said subset of special content into a set of processed data, wherein said set of processed data is representative of said subset of special content, but is in a form that the client can render;
      preparing a set of return content which comprises said set of processed data;
      sending said set of return content to the client across the network;
   the client performs the operations of:
      rendering said set of processed data in a display area;
      detecting an event;
      determining whether said event may cause said set of processed data to have to be updated; and
      in response to a determination that said event may cause said set of processed data to have to be updated, forwarding said event across the network to the server.

37. The system of claim 36, wherein:
   the server performs the operations of:
      determining whether said event causes said set of processed data to have to be updated;
      in response to a determination that said event causes said set of processed data to have to be updated, generating a set of updated processed data based upon said event;

sending said set of updated processed data across the network to the client for rendering; and the client performs the operations of:

rendering said set of updated processed data in said display area in place of said set of processed data.

38. The system of claim 37, wherein said set of processed data comprises one or more controls, and wherein determining, by the server, whether said event causes said set of processed data to have to be updated comprises:

determining whether said event indicates activation of one or more of said controls.

39. The system of claim 37, wherein said subset of special content is of a particular content type, and wherein transforming comprises:

selecting a module capable of processing said particular content type; and invoking said module to process said subset of special content to derive said set of processed data.

40. The system of claim 39, wherein determining, by the server, whether said event causes said set of processed data to have to be updated comprises:

invoking said module to process said event to determine whether said event causes said set of processed data to have to be updated.

41. The system of claim 40, wherein said set of updated processed data is generated by said module.

42. The system of claim 37, wherein said event comprises a user interface event, and wherein determining, by the client, whether said event may cause said set of processed data to have to be updated comprises:

determining whether said user interface event occurred within said display area.

* * * * *